Patented May 12, 1936

2,040,698

UNITED STATES PATENT OFFICE 2,040,698

METHOD OF VULCANIZING RUBBER AND NEW AND IMPROVED VULCANIZED RUBBER

Robert R. Lewis, Baldwin, and Albert J. Weiss, Mineola, N. Y., assignors to Vulcan Proofing Company, New York, N. Y., a corporation of New York No Drawing. Application November 24, 1933, Serial No. 699,502

2 Claims. (Cl. 18—53)

Our invention relates to a new and improved method of vulcanizing rubber and new and improved vulcanized rubber.

In order that articles made of rubber may give the serviceability expected of them it is necessary in most cases that the rubber be vulcanized. The essential elements necessary for most methods of vulcanization are sulfur, an accelerator and heat.

Organic compounds are most generally used as vulcanization accelerators today and most of these require the presence of a metallic oxide such as zinc oxide for activation of the accelerator. A few processes of hot vulcanization have been developed which do not require sulfur, but none of them have attained wide commercial application. At least two sulfur bearing organic compounds are known which, in addition to being accelerators of vulcanization, will function, in the absence of added sulfur, by giving up some of their sulfur atoms to the rubber to effect vulcanization. Sulfur so obtained is available in nascent form, combines very readily with the rubber and produces vulcanized rubber which will age remarkably well. Both of these materials are rather costly at present. We have discovered that other kinds of sulfur bearing organic compounds which are not accelerators themselves will in the presence of certain organic accelerators, give up sulfur in the nascent form for vulcanization and will produce vulcanized rubber of wonderful durability at less cost than using the sulfur bearing accelerators referred to above.

Furthermore, the new type of sulfur bearing organic compounds which we refer to will yield a sufficient quantity of sulfur to produce hard rubber approaching ebonite, which is impossible with the sulfur bearing accelerators. This hard rubber can be obtained with a much shorter period of heating than is possible with hard rubber made from high added sulfur percentages. Rubber compounds made with these non-accelerating sulfur bearing organic compounds have several other advantages.

There is no danger of a sulfur bloom appearing on the surface, the curing range is so broad that there is no danger of damage caused by over-curing, the ageing properties are excellent, and there is no need to worry about poor dispersion in hard rubber compounds as is the case when sulfur is used.

The compounds which we have discovered to have satisfactory properties for use as a vulcanizing agent are products made by the interaction of polysulfides and olefinic compounds containing the group $C_nH_{2n}$ combined with a negative radical. An example of the type of compound which functions satisfactorily is one made by a reaction between sodium polysulfide and ethylene dichloride as described in U. S. Patent No. 1,890,191. This material is marketed under the trade name of "Thiokol". It contains about 80% sulfur by weight. This material will be referred to hereafter as "Thiokol".

In the presence of small quantities of a certain group of organic accelerators, "Thiokol" will give up sulfur to vulcanize rubber in which the two materials are incorporated. Zinc oxide may be present to assist the reaction. The group of accelerators which have been found to accomplish this are the so-called Thiurams, namely tetra methyl thiuram monosulfide, tetra methyl thiuram disulfide and dipentamethylene thiuram tetra sulfide. The proportions of Thiokol and accelerators are capable of infinite variation with corresponding variation in characteristics of the vulcanized rubber.

In order to further explain the invention a formula is given for a soft rubber compound and one for a hard rubber compound to illustrate the different proportions needed for these two extremes:

Soft rubber compound

|  | lbs. | ozs. |
|---|---|---|
| Rubber | 50 | |
| "Thiokol" | 1 | 12 |
| Tetra methyl thiuram disulfide | | 12 |
| Mercaptobenzothiozole | | 4 |
| Phenyl beta naphthylamine | 1 | |
| Stearic acid | | 8 |
| Zinc oxide | 22 | |
| Clay | 24 | |
| | 100 | 4 |

The "Thiokol" supplies the sulfur for vulcanization. The tetra methyl thiuram disulfide serves as an accelerator with mercaptobenzothiozole as a complementory accelerator. The latter may be omitted without any important difference being noted. The phenyl beta naphthylamine is an anti-oxidant. There are a number of other materials which may be satisfactorily substituted for this ingredient. The stearic acid supplies fatty acid to overcome variations in crude rubber. About 5% of zinc oxide is desirable to activate the accelerator, the remainder acts as a filler. The clay is a filler and can be replaced with any desired filler. The proportion of rubber and filler in the batch may be varied to suit any particular need without departing from this invention. Likewise the kind of filler may vary from that mentioned above or special purpose ingredients may be added.

A compound such as that given above will vulcanize in a standard testing mold and hydraulic press in fifteen minutes at 278° F. to give a tensile strength of 2,800 pounds per square inch cross section. This stock when cured for three hours at the same temperature will still have a tensile strength of 2,200 pounds per square inch. These figures serve to illustrate the extremely broad curing range. The stock will withstand service at high temperatures remarkably well. It will also withstand the disintegrating action of oils and solvents remarkably well. It will not bloom.

Hard rubber compound

|  | lbs. | ozs. |
|---|---|---|
| Rubber | 50 |  |
| "Thiokol" | 25 |  |
| Tetra methyl thiuram disulfide | 2 | 8 |
| Zinc Oxide | 5 |  |
| Magnesium Carbonate | 5 |  |
| Stearic Acid |  | 8 |
| Paraffin |  | 8 |
| Carbon Black | 25 |  |
|  | 112 | 8 |

The "Thiokol" furnishes the sulfur for vulcanization. The tetramethyl thiuram disulfide acts as an accelerator, preferably activated by zinc oxide. The magnesium carbonate adds stiffness. The stearic acid and paraffin are present for a special purpose in this stock, the purpose being to prevent the stock from sticking to the surface with which it comes in contact during vulcanization. Carbon black is used as a filler to reinforce and stiffen the stock. This compound will vulcanize to a hardness of 90 as determined by the Shore Durometer in fifteen minutes at a temperature of 292° F.

This compound is, also, capable of any desirable variation in quality and filler content. The hardness can be varied either by varying the filler content or by varying the "Thiokol" and accelerator proportions or both. For example, we have found it desirable for some purposes to incorporate large percentages of hard rubber dust. The free sulfur present in the hard rubber dust enters into the vulcanization reaction and it is, therefore, possible to reduce the proportion of "Thiokol" and still obtain vulcanizates just as hard as, or harder than the compound given above.

The formulae given above indicate the extremely wide range of application of which this invention is capable. The proportions and usable materials are capable of wide variation. Instead of "Thiokol" which is a reaction product obtained from the interaction of sodium polysulfide and ethylene dichloride, other materials may be used such as the reaction products obtained from the interaction of other halogen additive compounds of the olefin series and other alkaline polysulfides, preferably of the alkali metals, alkaline earths, or ammonia.

While it has been found that the accelerators mentioned work satisfactorily, they are not the only ones that will work. Other accelerators may function just as well. The basic idea of the invention is that the sulfur necessary for vulcanization is obtained from the produce of a reaction between a halogen substituted olefine and a polysulfide, and the invention is not limited to the use of any particular accelerator or group of accelerators.

Likewise the "Thiokol" may be considered as being a type of a polymerized material which results from the reaction of sulfur and a halogenized unsaturated hydrocarbon. This polymerized material is unaffected by inks, oils, and cleaning solvents.

In order to make up the mixtures above mentioned, the "Thiokol" can be masticated on a mill until it becomes somewhat plastic. The rubber can be separately masticated and the "Thiokol" and the rubber can then be milled together. The other substances can then be uniformly intermixed by means of a mill, so as to form a uniform mixture or compound.

Compounds of the types above mentioned can be applied to any suitable base, such as a sheet of fabric, by means of a three-roll calender.

In making the polymerized compound above mentioned, the ethylene dichloride may be replaced by propylene dichloride or by other suitable halogen additive compounds of the olefin series. Likewise the dibromides of the olefins can be used.

We claim:
1. A method of making a vulcanized rubber product which consists in heating to ordinary vulcanization temperatures a rubber mix containing "Thiokol" and a small quantity of a thiuram sulfide accelerator, said "Thiokol" being the sole vulcanizing agent and decomposing in the presence of the accelerator at the vulcanizing temperature to furnish all of the sulfur necessary for the vulcanization of the rubber, said "Thiokol" also being present in said rubber mix in amounts no greater than one part of "Thiokol" to two parts of rubber.

2. A vulcanized rubber product prepared in accordance with claim 1.

ROBERT R. LEWIS.
ALBERT J. WEISS.